United States Patent [19]

Desbois et al.

[11] 4,099,206
[45] Jul. 4, 1978

[54] PIEZOELECTRIC DEVICE RESPONSIVE TO OPTICAL IMAGE FOR GENERATING AN ELECTRICAL SIGNAL

[75] Inventors: Jean Desbois; Pierre Tournois, both of Paris, France

[73] Assignee: Thomson-CSF, Paris, France

[21] Appl. No.: 560,925

[22] Filed: Mar. 21, 1975

[30] Foreign Application Priority Data

Mar. 26, 1974 [FR] France .................... 74 10300

[51] Int. Cl.² .................. H04N 3/14; H01J 39/12; H01L 41/04
[52] U.S. Cl. ............... 358/213; 250/211 R; 310/328
[58] Field of Search ............ 178/7.1, 7.6; 310/9.8, 310/8.1, 311, 313, 328; 250/211 J, 211 R, 578; 340/173 LS; 358/213

[56] References Cited

U.S. PATENT DOCUMENTS

| | | | |
|---|---|---|---|
| 3,446,975 | 5/1969 | Adler et al. | 310/8.1 |
| 3,826,865 | 7/1974 | Quate et al. | 178/7.6 |
| 3,826,866 | 7/1974 | Quate et al. | 178/7.6 |
| 3,836,712 | 9/1974 | Kornreich et al. | 178/7.6 |
| 4,041,536 | 8/1977 | Melcher et al. | 358/213 |

*Primary Examiner*—John C. Martin
*Attorney, Agent, or Firm*—Roland Plottel

[57] ABSTRACT

A piezoelectric substrate is subjected to the continuous excitations produced by a high-frequency electric field of fixed radian frequency $\alpha$ applied between its two opposite faces; high-frequency electrical pulses of radian frequency $\alpha_p$ are applied to the periodic network of conductors illuminated by the image; the electrical conductivity at the surface of the substrate at each point is made a function of the illumination directed towards said point, for example by the application of a photoconducting semi-conductor covering the network or by a substrate whose conductivity is directly modulated by the incident light. The non-linear interaction between the two substrate excitations induces a surface wave whose intensity is modulated by the luminous intensity and which is picked up by the transducers. Application with fixed $\alpha_p$ to the point by point read-out of a linear optical image and with $\alpha_p = \alpha_p(t)$ to the analysis of its spatial frequencies.

20 Claims, 8 Drawing Figures

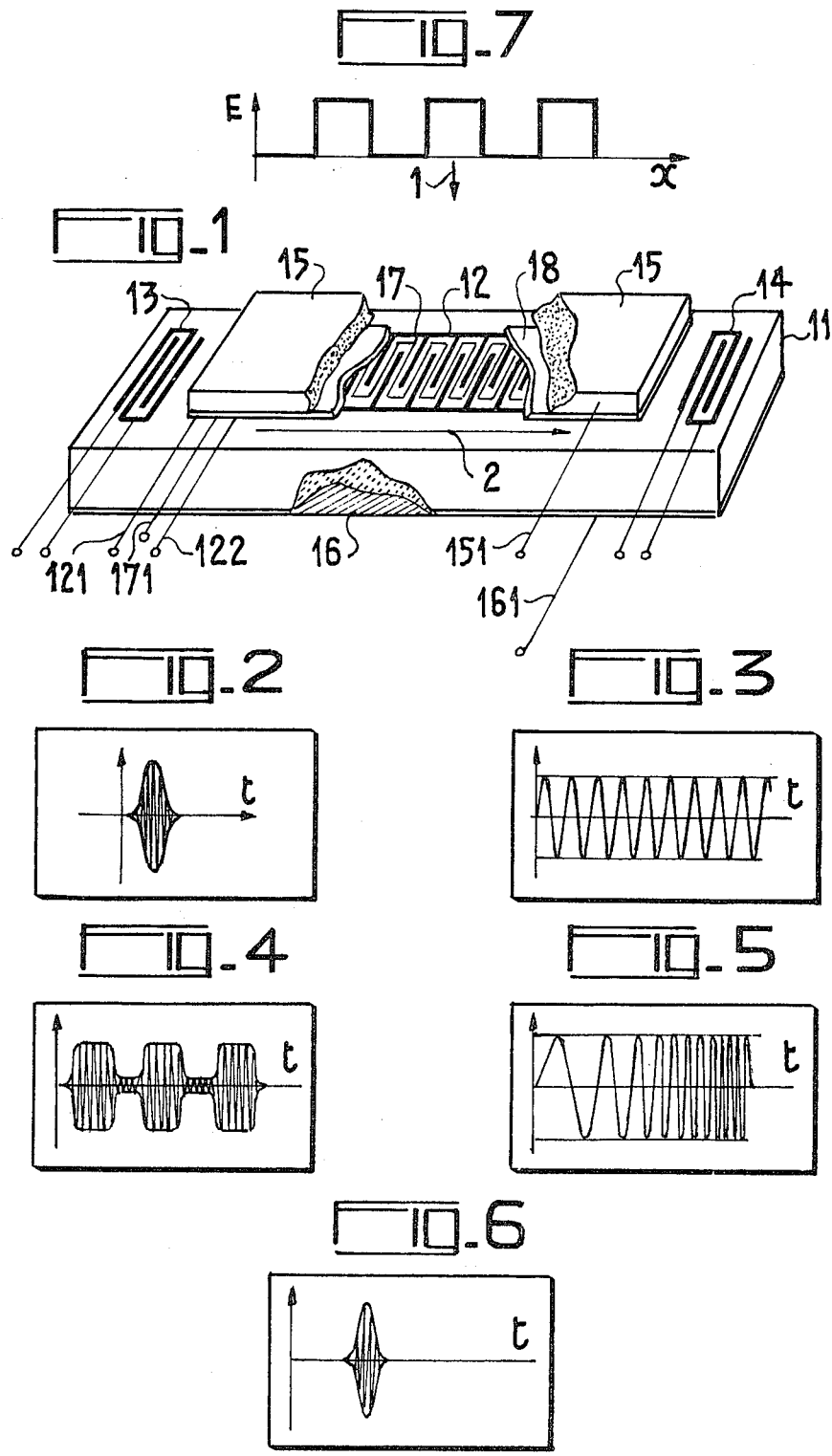

PIEZOELECTRIC DEVICE RESPONSIVE TO OPTICAL IMAGE FOR GENERATING AN ELECTRICAL SIGNAL

The present invention relates to a system for processing an optical image such as that produced in a transparent medium by the focusing of or interference between light waves, which image is to be converted into an electrical signal.

The known systems for processing two-dimensional images (and in particular read-out systems) generally involve the splitting down of said image into a given number of elements known as points, defined by an illumination or a luminance.

An assembly of point components, for example photoelectric cells constituting the mosaic of a target, can be "scanned" using a time-division multiplex procedure, in order to reconstitute the illumination function of the image focused upon the mosaic. This procedure is well known within the television field.

It is a matter of interest to be able to effect point by point processing or read-out of such an image. The image itself is recorded upon the target line by line in that sense of the word which is utilized, for example, in the context of television scanning operations, i.e., to transpose into a time-based electrical signal a spatial light energy distribution, which is done by means of a picked off signal enabling the information contained in such a line to be extracted.

Systems of this kind are known which have recourse to non-linear interactions of the kind occurring at the surface of a propagation medium, between acoustic surface waves.

An example of this kind of system has been described by MOLL, OTTO and QUATE in the Journal de Physique, Colloque C6, supplement to N°. 11–12, volume 33 November–December 72, page 231, and constitutes the nearest prior art to the present invention. Another system, employing only a single surface wave, has been described by TAKADA et al in the magazine Applied Physics Letters, volume 23 N°. 8, October 1973.

The system in accordance with the present invention employs non-linear interactions taking place between a continuous volumetric wave and a surface excitation distributed uniformly at the surface of the device, which interaction gives rise to a resultant surface wave and it is this latter which is converted by means of an electro-acoustic transducer into an electrical signal.

In accordance with one feature of the present invention, it is possible by means of a control signal applied to the system, to effect read-out of a linear optical image formed at the active surface of the device.

In accordance with another feature of the present invention, it is possible using the same system and employing another applied control signal, to produce in the form of an electrical signal the-time-based transposition of the unidimensional spatial Fourier transform of the linear optical image formed at the surface of the device.

Other features of the invention will become apparent from the ensuing description, given by way of example and illustrated by the attached figures where:

FIG. 1 is a perspective view of the system in accordance with the invention;

FIGS. 2, 3 and 4 illustrate the shapes of the various electrical signals when the system of the previous figure is operated as an image reader;

FIGS. 5 and 6 illustrate the shape of the electrical signals when the system is operated as a Fourier analyser;

FIG. 7 is a diagram associated with FIG. 1.

Figure 8:
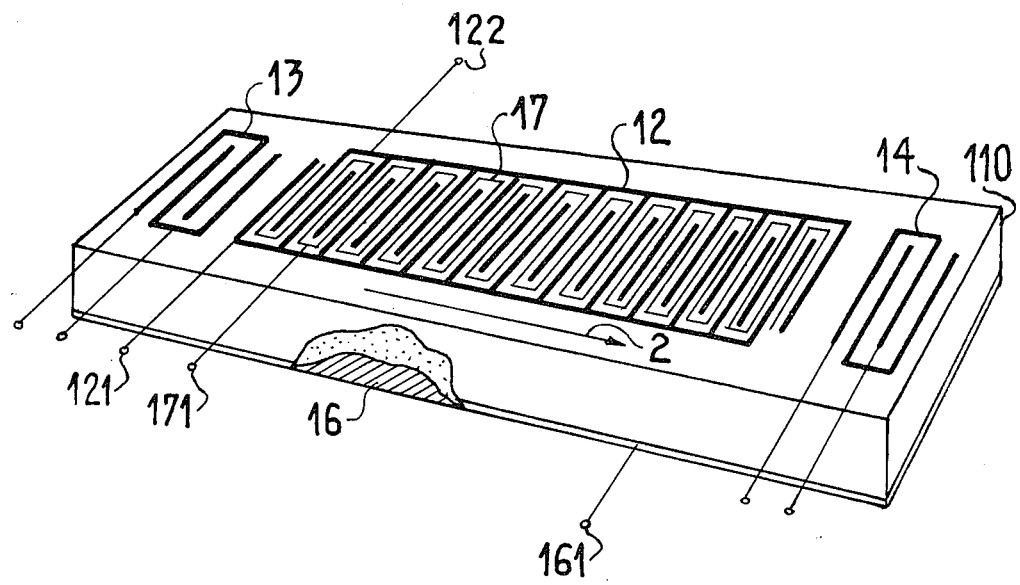
FIG. 8 is a perspective view of another embodiment of the system according to the invention.

In FIG. 1, the voltage sources supplying the electrical signals have not been shown.

The representation of the system and of the signals is not to scale, the illustrations having been much enlarged in order to facilitate understanding and to make the drawing clearer.

The system shown in FIG. 1 consists of a substrate of piezoelectric material 11, upon one face of which there have been deposited an interdigital network 12 and electro-acoustic transducers 13 and 14, for example interdigital comb structures, located at adjacent to and on opposite sides of the network 12 and having dimensions, in the direction of propagation of the surface waves, which are smaller than that of the network 12.

A semi-conducting and photoconducting medium 15 covers the interdigital network 12 but is electrically insulated from it by a dielectric layer 18.

The piezoelectric medium 11 is permanently excited by an electric field of radian frequency $\alpha$, generating at resonance in the piezoelectric medium 11, a periodic volumetric network of elastic stresses. The excitation electrodes may be constituted by metallized coating 16 applied to the bottom face of the medium 11 and by a serpentine formation 17 arranged between the conductive bands of the network 12, the leads to which are respectively marked 161 and 171; the excitation voltage is applied between these connections and has the form shown in FIG. 3.

The incident light energy is directed in accordance with the arrow 1 on to the free surface of the semi-conducting and photoconducting medium 15, through an optical system which has not been shown in the figure. This energy spatially modulates the conductivity of the medium 15. Accordingly the luminance of the image formed at the surface of the medium 15 is converted into a conductivity $F(x)$ which is a function of the abscissae value $x$ considered along the medium 15. The abscissae axis is the arrow 2 shown in the figure. The interdigital network 12 extends beneath the medium 15 over the whole length thereof which is limited, in the drawing, to its effective length, that is to say the length exposed to the incident radiation coming from the image.

The interdigital network 12 is excited at determinate instants, by a short-period, high-energy electrical pulse having a carrier radian frequency $\alpha_p$ referred to as the pumping radian frequency, illustrated in FIG. 2 and applied across the terminals 121 and 122 of the two comb structures of the network 12.

This pulse creates throughout that surface area of the piezoelectric medium 11 occupied by the interdigital network 12, an electric field whose non-linear interaction with the field produced by piezoelectric effect from the network of stresses generated by the continuous excitation of radian frequency $\alpha$, induces an acoustic surface wave of radian frequency equal to the sum and difference of the radian frequencies $\alpha$ and $\alpha_p$. The amplitude of the thus created surface wave depends upon the conductivity $F(x)$ of the semi-conductor 15, which modulates by influence the intensity of the non-linear interaction between the pumping radian frequency $(\alpha_p)$ and the continuous excitation $(\alpha)$, in accordance with the luminance existing at the abscissae point x considered. This wave has the shape shown in FIG. 4 for an illumination E which permanently has an intensity whose distribution along the axis x is in accordance with the diagram of FIG. 7.

The surface wave generated by the read-out pulse of radian frequency $\alpha_p$ propagates at the surface of the piezoelectric medium 11 towards the transducers 13 and 14, provided that the spatial periodicity $p$ of the network 12 is such that:

$$2\pi/p = \alpha_p \pm \alpha/C,$$

where C is the speed of propagation of the acoustic surface wave over the medium 11.

The mechanical or electrical effects consisting of multiple reflections whose phase coincidence at the operating frequency runs the risk of producing parasitic phenomena, can be eliminated, as far as the mechanical effect is concerned, by the use of the electrode 17 of serpentine form which doubles the periodicity of the network 12 and, as far as the electrical effect is concerned, by placing the whole network 12 at the earth potential carried by the electrode 17 when the network 12 becomes passive, that is to say when the excitation of the radian frequency $\alpha_p$ ceases. The "mechanical" and "electrical" periodicities of the assembly of network 12 and electrode 17, thus have no effect upon the surface wave.

Under these conditions, the resultant electrical signal available at the terminals (not referenced) of the transducers 13 and 14, is a signal which represents in time the generated surface wave, which latter is itself representative of the conductivity $F(x)$ in the semi-conductor and therefore of the linear optical image formed at the surface thereof; it takes the form of a carrier modulated at the radian frequency $\alpha \pm \alpha_p$ with an amplitude proportional to $F(x)$. This signal is picked off across a load, not shown, whose nature depends upon the use to which the signal is to be put.

Moreover, the signals coming from different points on this line appear at the terminals of the transducers 13 and 14 separated in time because of the dissimilar trajectories which the acoustic waves corresponding to these points have to follow in order to reach the transducers.

Thus, point by point read-out of the linear image recorded along the photoconductor 15 has been achieved.

The excitation of constant radian frequency $\alpha$ can be applied to the piezoelectric material solely through the medium of the electrodes 16 and 17, between the terminals 161 and 171 as we have seen before, or, in a first variant embodiment, between the electrode 16 and one of the groups of conductive bands of the interdigital network 12, between the terminals 161 and 122, said group being at the earth potential common to the excitations of radian frequencies $\alpha$ and $\alpha_p$, the other group of conductive bands being supplied with said pumping excitation of radian frequency $\alpha_p$. In a second variant embodiment, the continuous excitation of radian frequency $\alpha$ can be applied between the electrode 16 and the semiconductor 15 whose connection is marked 151 in FIG. 1, whilst the pumping excitation is applied to the network 12, these two excitations being electrically balanced in relation to the common earth potential of the serpentine structure 17.

In another applicaton of the same system, it is possible, as we shall see, to obtain by way of output signal at the terminals of the transducer 14 (or 13), the time-based transposition of the unidimensional Fourier transform of the optical image formed at the surface of the system. The pumping excitation is constituted by a radian frequency $\alpha_p(t)$ (FIG. 5) applied to the network 12 and varying linearly with time, between two values $\alpha_{p1}$ and $\alpha_{p2}$. The non-linear interaction between the constant excitation of radian frequency $\alpha$ and the pumping excitation of radian frequency $\alpha_p$, through the medium of the surface wave which is generated, produces a time signal having a carrier radian frequency $\alpha_p \pm \alpha$ and an amplitude proportional to the contribution of a spatial frequency corresponding to the instantaneous value of the radian frequency $\alpha_p$. The device then operates as an analyser of the spatial frequency in question.

It is possible to represent by the term exp $(j\alpha t)$ the excitation of constant radian frequency $\alpha$. The pumping excitation of radian frequency $\alpha_p(t)$ can be split into the product of a time term exp $(j\alpha_p t)$ and a spatial term consisting of the breakdown into a Fourier series of fundamental periodicity $p$, of the excitation at the surface of the medium 11 due to the discrete structure of the netword 12. This spatial term can be written:

$$\sum_{-\infty}^{+\infty} P_n \exp\left(j\frac{2\pi n}{p}x\right);$$

from which we obtain the expression for the vibrational state produced at the surface of the medium 11 by the pumping excitation, namely:

$$\exp(j\alpha_p t) \sum_{-\infty}^{+\infty} P_n \exp\left(j\frac{2\pi n x}{p}\right),$$

$P_n$ representing the amplitude of the spatial component of the $n^{th}$ order harmonic. Finally, the acoustic image can be represented by a similar breakdown and the conductivity $F(x)$ of the semi-conductor 15 can be represented by a sum of components of the kind:

$$\int A(2\pi f) \exp(j2\pi f x) \, df.$$

Let us put $\phi = 2\pi f$, this being the spatial radian frequency of the optical image, and consider only one of these components in the following.

Let us also assume that filtering means are provided so that the output signal only contains the sum signal of radian frequency $\alpha + \alpha_p$.

The contribution made by a particular spatial frequency $f$ (radian frequency $\phi$), will be obtained in the form of an acoustic surface wave propagating towards the transducer 14 if the phase factor:

$$\exp j\left[(\alpha + \alpha_p) t + \phi x + n\, 2\pi/p\, x\right]$$

remains stationary in respect of an observer travelling along with the surface wave, or in other words:

$$d/dx\left[\phi x + n\, 2\pi/p\, x + (\alpha + \alpha_p)t\right] = 0,$$

or:

$$\phi + n\, 2\pi/p + \alpha + \alpha_p/C = 0 \text{ since } dt/dx = 1/C.$$

C still being the velocity of propagation of the acoustic wave, this can be written as:

$$f = n'/p - f_p + f_\alpha/C \quad (1)$$

(where $n' = -n$), a multiform relationship in which $f$ is a particular spatial frequency, $f_p$ is the pumping frequency,
$f_a$ is the continuous excitation frequency,
$p$ is the spatial periodicity of the network 12.

If, for example, it is required to analyse a set of spatial frequencies $\{f_1, f_2\}$ such that the relationship (1) is only satisfied for the condition $n' = 1$ for example, whatever value $f$ may adopt within the interval $\{f_1, f_2\}$, then the conditions will be achieved by rendering the multiform linear relationship (1) given earlier, between the spatial frequency f and the pumping frequency $f_p$, uniform, thus:

$$f = 1/p \cdot f_p + f_a/C.$$

With this kind of operation of the system in accordance with the invention, the choice of the pumping frequency interval $\{f_{p1}, f_{p2}\}$ thus makes it possible to confine the situation to a value of n for which spatial filtering of the pumping excitation components takes place; in the breakdown into a Fourier series, which occured in the preceding example ($n' = 1$), only the term $P_{-1}$ plays any part. The determination of these conditions is also governed by the choice of the periodicity p of the network 12; this periodicity must be such that it ensures uniformity in the relationship (1) for the desired spatial frequency interval $f_1, f_2$, and also ensures that there is no overlap between the spatial frequency bands being analysed.

The contibution of the spatial frequency $f$ appears at the terminals of the transducer 14 in the form of an electrical signal having a carrier radian frequency $\alpha + \alpha_p$ and an amplitude proportional to A $(2\pi f)$ as shown in FIG. 6.

In the foregoing, a method of implementing the system in accordance with the invention when operated as an analyser, has been described.

This application is not the only practicable one. It is equally possible, in other words, confining the network 12 to the picking off of the output signal, to utilise the transducer 13 for example in order to apply to the device the aforesaid linearly modulated pumping signal of radian frequency $\alpha_p(t)$. The expression for the phase factor characterizing the propagation of the surface wave emitted by the transducer 13, is calculated by means of the same elements as before:

as in the earlier case, the continuous excitation can be written:

$$\exp (j\alpha t)$$

the propagating pumping excitation is in this case written as:

$$\exp j(\alpha_p t - kx),$$

where the wave number $k$ is given by $\alpha_p/C$ a spatial component of the illumination law can be written as before, in the form $A(\phi) \exp j\phi x$.

The phase factor is then written as:

$$\exp j [(\alpha + \alpha_p)t] \exp j [\phi x \pm {}^\alpha p/C \, x].$$

The interdigital network 12 picks up a carrier signal $(\alpha + \alpha_p)$ resulting from a vibrational state generated beneath the network, provided that the wave number involved in the spatial phase term, namely:

$$\phi \pm {}^\alpha p/C$$

is equal to one of the spatial harmonic wave numbers of the network 12 or in other words, using the same notation as before:

$$n \, 2\pi p.$$

If we continue to consider the arrow 2 as signifying the direction of propagation of the pumping acoustic wave, then the condition of equality between the wave numbers in question becomes:

$$\phi - {}^\alpha p/C = n2\pi/p.$$

The same reasoning as before applies to the choice of the value of $n$, the phase relationship in this case, for $n = 1$, being $$f = 1/p + f_p/C.$$

In a variant embodiment of the systems in accordance with the invention, the material 11 is both piezoelectric and a photoelectric semi-conductor. Such materials are for exemple cadmium sulphide, CdS, or gallium arsenide GaAs. In such a variant embodiment shown in FIG. 8, layers 15 and 18 are omitted; the conductivity of the piezoelectric substrate referenced 110 in the Figure is directly modulated by the incident light.

Utilising so-called optical scanning means, these being well known per se, it is possible to supply the lines of a two dimensional image one by one to the network 12 and thus to read out said image at a relatively slow rate using a single element of the kind shown in FIG. 1.

A plurality of these elements arranged parallel to their major dimension, enable various image processing functions to be performed as for example correlation with several copies available in the form of stored signals in order to make it possible to recognise given shapes in the image.

What is claimed is:

1. A system for processing an optical image, comprising piezoelectric substrate having two opposite faces and means which permanently develop between said two faces a high-frequency field of fixed radian frequency $\alpha$;

an acousto-electric transducer on one of said faces and providing, at its terminals when an acoustic wave travelling over said face reaches said transducer, an electrical signal corresponding to said wave;

a network applied to said same face of the substrate, said network being a periodic network of aligned electrical conductors extending over a given length adjacent to said transducer, and means for applying to said face, between said conductors, pulses of a high-frequency electric field of radian frequency $\alpha_p$;

optical means for directing an optical beam coming from said image, towards said substrate at the location of said network, and means for changing at each point on said face of said substrate, along said network, the electrical conductivity in accordance with the illumination directed towards each point.

2. A system for processing an optical image as claimed in claim 1, characterized in that said means for generating said conductivity consists of a substrate which is itself semi-conducting and photoconducting.

3. A system for processing an optical image as claimed in claim 2, characterized in that said substrate is made of cadmium sulphide (CdS).

4. A system for processing an optical image as claimed in claim 2, characterized in that said substrate is made of gallium arsenide (GaAs).

5. A system for processing an optical image as claimed in claim 1, characterized in that said means for applying said high-frequency electric field of fixed radian frequency $\alpha$, comprises a metal electrode applied to the opposite face of said substrate to that which carries said network, a second metal electrode applied to that face of said substrate which carries said network and means for applying between said two electrodes, said electric field of radian frequency $\alpha$.

6. A system for processing an optical image as claimed in claim 1, characterized in that said periodic network of conductors is an interdigital network constituted by two comb structures located opposite one another with their teeth alternating with each other.

7. A system for processing an optical image as claimed in claim 6, characterized in that said means for applying said pulses of the high-frequency electric field of radian frequency $\alpha_p$, comprise said comb structures themselves and means for applying between said two comb structures, said electric field.

8. A system for processing an optical image as claimed in claim 6, characterized in that said second electrode is a serpentine structure arranged between the teeth of said comb structure.

9. A system for processing an optical image as claimed in claim 1, characterized in that said radian frequency $\alpha_p$ is fixed and independent of time, said system making it possible in particular to effect point by point read-out of a linear image at the terminals of said transducer.

10. A system for processing an optical image as claimed in claim 1, characterized in that said radian frequency $\alpha_p$ varies linearly with time, between two values $\alpha_{p1}$ and $\alpha_{p2}$, said system making it possible for a given value of said radian frequency, to effect analysis of the spatial frequencies of the image at the terminals of said transducer, within limits previously chosen as a function of the periodicity of said periodic network.

11. A system for processing an optical image, comprising
piezoelectric substrate having two opposite faces and means which permanently develop between said two faces a high-frequency field of fixed radian frequency $\alpha$;
an acousto-electric transducer on one of said faces and providing, at its terminals when an acoustic wave travelling over said face reaches said transducer, an electrical signal corresponding to said wave;
a network applied to said same face of the substrate, said network being a periodic network of aligned electrical conductors extending over a given length adjacent to said transducer, and means for applying to said face, between said conductors, pulses of a high-frequency electric field of radian frequency $\alpha_p$;
optical means for directing an optical beam coming from said image, towards said substrate at the location of said network, and means for modulating the interaction of the applied highfrequency fields ($\alpha$ and $\alpha_p$) in accordance with the illumination of said beam directed towards said substrate.

12. A system for processing an optical image as claimed in claim 11, characterized in that said means for modulating consist of a photoconducting semi-conductor medium applied to said network through the medium of an electrically insulating layer, over the whole length of said network.

13. A system for processing an optical image as claimed in claim 12, characterized in that said means which apply the high-frequency electric field of fixed radian frequency $\alpha$, comprises a metal electrode applied to the opposite face of said substrate and a contact applied to said semiconductor medium, whereby there is applied between said electrode and said contact said electric field of radian frequency $\alpha$.

14. A system for processing an optical image as claimed in claim 12, characterized in that said periodic network of conductors is an interdigital network constituted by two comb structures located opposite one another with their teeth alternating with each other.

15. A system for processing an optical image as claimed in claim 14, characterized in that said means for applying said pulses of the high-frequency electric field of radian frequency $\alpha_p$, comprise said comb structures themselves and means for applying between said two comb structures, said electric field.

16. A system for processing an optical image as claimed in claim 14, characterized in that said second electrode in a serpentine structure arranged between the teeth of said comb structure.

17. A system for processing an optical image as claimed in claim 12, characterized in that said radian frequency $\alpha_p$ is fixed and independent of time, said system making it possible in particular to effect point by point read-out of a linear image at the terminals of said transducer.

18. A system for processing an optical image as claimed in claim 12, characterized in that said radian frequency $\alpha_p$ varies linearly with time, between two values $\alpha_{p1}$ and $\alpha_{p2}$, said system making it possible for a given value of said radian frequency, to effect analysis of the spatial frequencies of the image at the terminals of said transducer, within limits previously chosen as a function of the periodicity of said periodic network.

19. A system for processing an optical image, comprising piezoelectric substrate having two opposite faces; means which permanently develop between said two faces a high-frequency field of fixed radian frequency $\alpha$; a network applied to one face of the substrate, said network being a periodic network of aligned electrical conductors extending over a given length and being an interdigital network constituted by two comb structures located opposite one another with their teeth alternating with each other; an electro-acoustic transducer applied to said substrate opposite said network for inducing in said substrate an acoustic wave propagating at the surface thereof in the direction of said network when an electrical signal is applied across its terminals; and means for applying said pulses of said high-frequency electric field of radian frequency $\alpha_p$, said means consisting of means for applying to the terminals of said electro-acoustic transducer the signals generating said field; optical means for directing an optical beam coming from said image, towards said substrate at the location of said network, and means for modulating the interaction of the applied high-frequency fields ($\alpha$ and $\alpha_p$) in accordance with the received illumination of said beam.

20. A system for processing an optical image as claimed in claim 19, characterized in that said radian frequency $\alpha_p$ varies linearly with time between two values $\alpha_{p1}$ and $\alpha_{p2}$, said system making it possible to analyse spatial frequencies of the image at the terminals of said network, within limits previously chosen as a function of the periodicity of said network.

* * * * *